(12) United States Patent
Padmanabhan et al.

(10) Patent No.: US 11,954,183 B2
(45) Date of Patent: Apr. 9, 2024

(54) SYSTEM AND METHOD USING METADATA TO MANAGE PACKAGED APPLICATIONS COMPONENTS BASED ON TENANT LICENSES

(71) Applicant: Salesforce.com, Inc., San Francisco, CA (US)

(72) Inventors: Prithvi Krishnan Padmanabhan, San Ramon, CA (US); Natasha Sushil Gupta, Broomfield, CO (US)

(73) Assignee: Salesforce, Inc., San Francisco, CA (US)

( * ) Notice: Subject to any disclaimer, the term of this patent is extended or adjusted under 35 U.S.C. 154(b) by 357 days.

(21) Appl. No.: 17/067,584

(22) Filed: Oct. 9, 2020

(65) Prior Publication Data

US 2022/0114238 A1   Apr. 14, 2022

(51) Int. Cl.
   *G06F 9/44* (2018.01)
   *G06F 8/61* (2018.01)
   *G06F 21/10* (2013.01)
   *G06F 21/12* (2013.01)

(52) U.S. Cl.
   CPC ............ *G06F 21/12* (2013.01); *G06F 8/61* (2013.01); *G06F 21/105* (2013.01); *G06F 21/1075* (2023.08)

(58) Field of Classification Search
   CPC .......... G06F 21/12; G06F 8/61; G06F 21/105; G06F 2221/0768; G06F 2221/0757; G06F 21/121

See application file for complete search history.

(56) References Cited

U.S. PATENT DOCUMENTS

| | | | |
|---|---|---|---|
| 6,816,882 B1 * | 11/2004 | Conner | G06F 21/121 |
| | | | 709/219 |
| 7,222,106 B2 * | 5/2007 | Block | G06F 21/10 |
| | | | 705/51 |
| 7,730,478 B2 | 6/2010 | Weissman | |
| 7,921,059 B2 * | 4/2011 | Chicks | G06Q 20/3829 |
| | | | 705/51 |
| 9,916,429 B2 * | 3/2018 | Hess | G06F 8/61 |
| 10,585,657 B2 | 3/2020 | Padmanabhan | |
| 10,701,054 B2 | 6/2020 | Padmanabhan et al. | |
| 11,038,771 B2 | 6/2021 | Padmanabhan | |
| 11,082,226 B2 | 8/2021 | Hildebrand et al. | |
| 11,100,091 B2 | 8/2021 | Padmanabhan et al. | |
| 11,126,618 B1 | 9/2021 | Padmanabhan | |
| 11,144,335 B2 | 10/2021 | Padmanabhan et al. | |
| 11,244,313 B2 | 2/2022 | Padmanabhan et al. | |
| 11,257,073 B2 | 2/2022 | Padmanabhan | |
| 11,288,280 B2 | 3/2022 | Padmanabhan et al. | |

(Continued)

*Primary Examiner* — Hang Pan
(74) *Attorney, Agent, or Firm* — Nicholson, De Vos, Webster & Elliott, LLP

(57) ABSTRACT

A method and system to manage application package installation in a multi-tenant system is provided. The method includes accessing metadata of an application package for distribution in the multi-tenant system, selecting a component of the application package with a permission guard in the metadata, evaluating permission guard logic to determine wither a target tenant in the multi-tenant system can install the component, and compiling and installing the component in response to the permission guard logic indicating the tenant of the multi-tenant system has met conditions to utilize the component.

18 Claims, 7 Drawing Sheets

(56) References Cited

U.S. PATENT DOCUMENTS

| | | | |
|---|---|---|---|
| 11,372,635 B2 | 6/2022 | Padmanabhan et al. | |
| 11,431,486 B2 | 8/2022 | Padmanabhan | |
| 11,468,406 B2 | 10/2022 | Padmanabhan | |
| 11,488,176 B2 | 11/2022 | Padmanabhan et al. | |
| 11,531,731 B2 * | 12/2022 | Faulhaber | G06F 21/105 |
| 11,568,437 B2 | 1/2023 | Padmanabhan | |
| 2008/0098465 A1 * | 4/2008 | Ramakrishna | G06F 21/10 |
| | | | 726/5 |
| 2011/0113425 A1 * | 5/2011 | Tuttle | G06F 8/61 |
| | | | 717/178 |
| 2013/0124867 A1 * | 5/2013 | Clayton, II | H04L 9/3247 |
| | | | 713/171 |
| 2013/0132530 A1 * | 5/2013 | Asahara | H04N 1/4406 |
| | | | 709/220 |
| 2014/0236846 A1 * | 8/2014 | Melika | H04W 4/50 |
| | | | 705/310 |
| 2015/0371012 A1 * | 12/2015 | Quinzin | H04L 9/14 |
| | | | 713/165 |
| 2019/0236559 A1 | 8/2019 | Padmanabhan | |
| 2019/0236562 A1 | 8/2019 | Padmanabhan | |
| 2019/0236598 A1 | 8/2019 | Padmanabhan | |
| 2019/0236606 A1 | 8/2019 | Padmanabhan et al. | |
| 2019/0238316 A1 | 8/2019 | Padmanabhan | |
| 2019/0303445 A1 | 10/2019 | Padmanabhan | |
| 2019/0340337 A1 * | 11/2019 | Faulhaber | G06F 21/105 |
| 2019/0377806 A1 | 12/2019 | Padmanabhan et al. | |
| 2020/0042939 A1 | 2/2020 | Padmanabhan | |
| 2020/0089663 A1 | 3/2020 | Padmanabhan | |
| 2020/0089670 A1 | 3/2020 | Padmanabhan et al. | |
| 2020/0089671 A1 | 3/2020 | Padmanabhan et al. | |
| 2020/0089672 A1 | 3/2020 | Velisetti et al. | |
| 2020/0133955 A1 | 4/2020 | Padmanabhan et al. | |
| 2020/0134656 A1 | 4/2020 | Padmanabhan | |
| 2020/0169546 A1 | 5/2020 | Padmanabhan | |
| 2020/0250174 A1 | 8/2020 | Padmanabhan et al. | |
| 2020/0250176 A1 | 8/2020 | Padmanabhan | |
| 2020/0250177 A1 | 8/2020 | Padmanabhan | |
| 2020/0250295 A1 | 8/2020 | Padmanabhan | |
| 2020/0250661 A1 | 8/2020 | Padmanabhan et al. | |
| 2020/0250683 A1 | 8/2020 | Padmanabhan et al. | |
| 2020/0250747 A1 | 8/2020 | Padmanabhan | |
| 2020/0252205 A1 | 8/2020 | Padmanabhan | |
| 2020/0252404 A1 | 8/2020 | Padmanabhan | |
| 2020/0252406 A1 | 8/2020 | Padmanabhan et al. | |
| 2020/0287718 A1 | 9/2020 | Hildebrand et al. | |
| 2020/0287719 A1 | 9/2020 | Hildebrand et al. | |
| 2020/0348928 A1 * | 11/2020 | Vora | G06F 8/61 |
| 2020/0349142 A1 | 11/2020 | Padmanabhan | |
| 2020/0349564 A1 | 11/2020 | Padmanabhan et al. | |
| 2021/0182423 A1 | 6/2021 | Padmanabhan | |
| 2021/0182773 A1 | 6/2021 | Padmanabhan | |
| 2021/0226774 A1 | 7/2021 | Padmanabhan | |
| 2021/0240498 A1 | 8/2021 | Padmanabhan et al. | |
| 2021/0243193 A1 | 8/2021 | Padmanabhan | |
| 2021/0342329 A1 | 11/2021 | Padmanabhan | |
| 2021/0374759 A1 | 12/2021 | Padmanabhan et al. | |
| 2021/0385087 A1 | 12/2021 | Hildebrand et al. | |

\* cited by examiner

FIG. 5

```xml
1  <permissions>
2    <permission_group>
3      <permission>
4        <name>
5        <type>
6        <index>
7      </permission>
8      <permission>
9        <name>
10       <type>
11       <index>
12     </permission>
13     <condition> 1 OR 2
14     <components>
15       <triggers>
16       <UI>
17         <tabs>
18         <>
19    </permission_group>
20
21  </permissions>
22
```

Tabs: Step 1: Ignore Certificates | LastMileController.cls | ut_LastMile.cls | <permissions> | MilePrivateSettings.GoogleMapsDistanceAPI.md-meta.xml

SYSTEM AND METHOD USING METADATA TO MANAGE PACKAGED APPLICATIONS COMPONENTS BASED ON TENANT LICENSES

TECHNICAL FIELD

One or more implementations relate to the field of application management in multi-tenant system; and more specifically, to the dynamic management of application packages based on tenant licensing and permissions.

BACKGROUND ART

A multi-tenant architecture is a type of computing architecture in which a single instance of a software application runs on a set of shared computing resources (e.g., a set of servers) and serves multiple customers that contract for services and/or compute resources from a provider of the multi-tenant architecture. The customers are referred to as tenants. Tenants may be given the ability to customize some parts of the applications for their own usage. Customizations can include basic things such as the color scheme of the user interface of the application or more complex items like customized business rules or component module configuration. Generally, tenants cannot customize the code of the shared application, however, different tenants may utilize different components that can be configured for use as part of the application.

In a multi-tenant architecture, multiple instances of an application operate in a shared execution environment. Each tenant is integrated in use of physical hardware, but tenant specific data is separated. Thus, a single instance of the code of a software application will run on the hardware of a server and serve multiple tenants. This reduces the compute resources required relative to a multi-instance architecture where a separate instance of a software application is executed for each tenant. In some cases, a software application in a multi-tenant architecture can share a dedicated instance of configurations, data, user management and other properties. However, in other cases these aspects are not shared.

Multi-tenant software applications can share the users, interfaces, business rules, databases, and related aspects. However, tenants can customize these aspects and the users associated with each tenant can have varying access to these aspects such that certain users and certain tenants can have differing access to different aspects of the software applications and have permissions to customize some of these aspects.

Due to the complexity of the multi-tenant architecture, development for multi-tenant environments is similarly complex. A customer that seeks to develop a software application for execution in the multi-tenant architecture must have a detailed understanding of the operation of the multi-tenant architecture. The software applications are specialized and tailor fit to operating within the multi-tenant architecture, which requires a high level of knowledge of the multi-tenant architecture operating environment and is more time and manpower intensive to develop.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 5 is a diagram of an example of metadata for licensing and application management in a multi-tenant system according to some example implementations.

DETAILED DESCRIPTION

Figure 1:
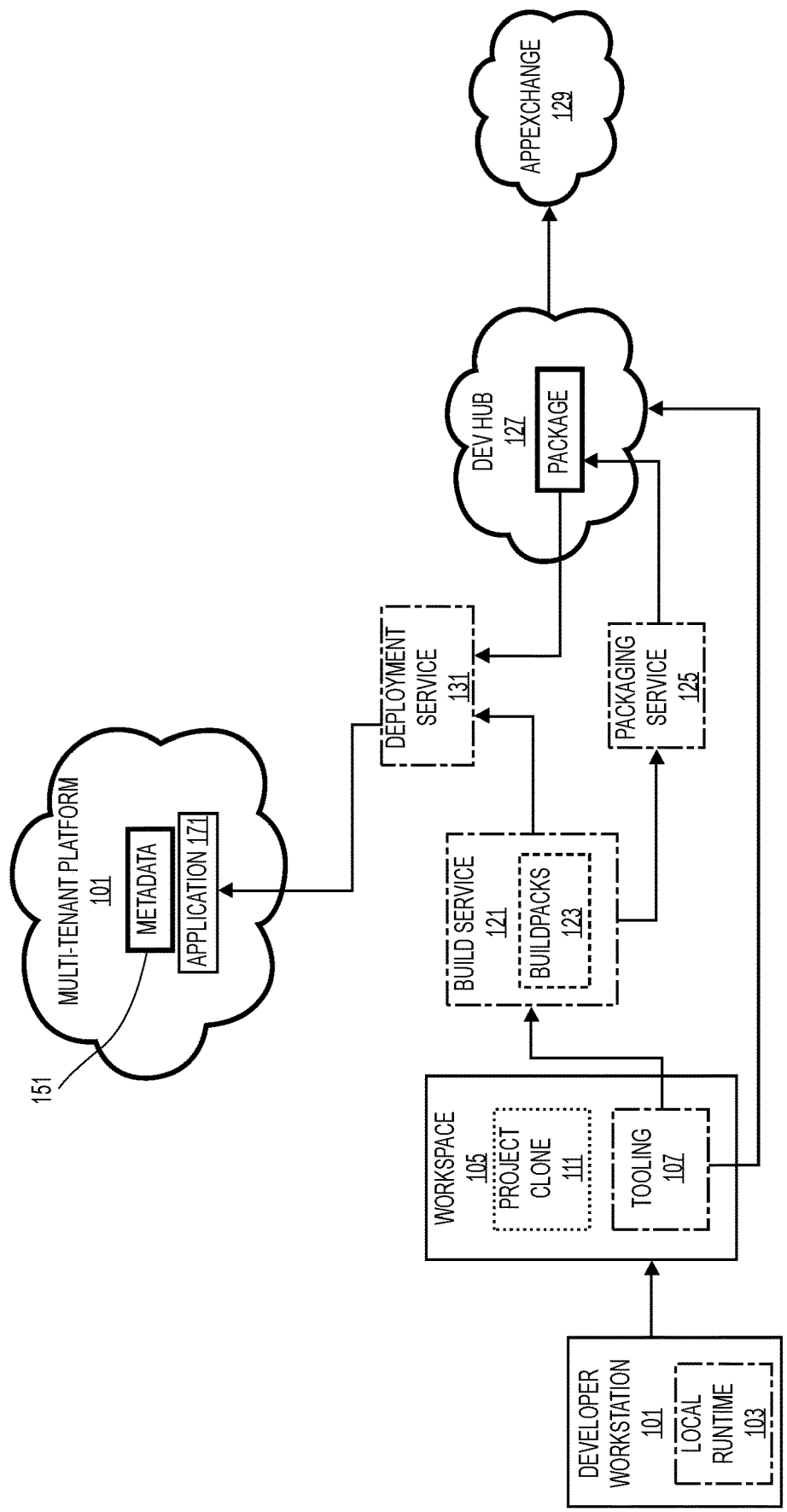
FIG. 1 is a block diagram illustrating an example implementation of a system for handling application packages in a multi-tenant system.

The following description describes methods and apparatus for package management that can dynamically account for tenant licensing of package components during operation. The embodiments implement an application and licensing manager and related components that enable dynamic configuration of the components of an application in a multi-tenant system according to the licensing rights of each tenant that utilizes the application.

Applications are distributed in multi-tenant systems as packages, for example, 'managed' packages. These packages are groupings of components that make up the application. Some of the components are code that is created by the developer of the application, while other components are code that are developed by other entities (e.g., specialized coding components or libraries of functions utilized by the application). A 'managed' package is a package that has an ongoing management by the developer to update the application and the components of the application over time. One of the biggest problems for managed packages is that there is no easy way for the packages to depend on a given feature or component that is provided by other entities (i.e., other than the developer) due to licensing permissions. Where an application is to be installed for a given multi-tenant system or tenant of the multi-tenant system (e.g., a given organization in the multi-tenant system), the developer of the application and developers and administrators of the multi-tenant system that build the applications and associated components of managed packages that support them within the multi-tenant system have to create multiple package versions based on the permutations of features (i.e., components) that are need from the multi-tenant system and any external non-developer components. This creates an extra burden to create the multiple versions of the package, referred to as extension packages, as well as creating issues for tenants when they install the packages can receive errors to turn on a feature (i.e., component). For example, a shift management application package may use some of the objects from the another supporting application package.

Even though most of the shift management application can work without the components from the other package developers have to create components on an extension package just for these relied upon components from the other application. In addition to the added work, the tenants have a bad experience when witnessing failures when component dependencies are installed for the first time and for package developers additional burden is created to support these variations.

In multi-tenant systems that operate with applications based on compiled language code, this set of dependencies between components can prevent successful compilation of the application. The implementations solve these problems using a metadata-driven approach wherein the metadata-of application packages can specify if specific components need to be guarded by a license or permission. The components can be anything that is supported in the multi-tenant system such as flows, user interface components, objects, and similar application components. The metadata can have any format and can be in a single file or object or distributed over any number of files or objects.

When the application package is installed components that are not part of a permission guard are first compiled and the package is installed. However, the components that are part of the permission guard are evaluated when that particular feature is turned on or activated. In some implementations, the classes, objects, and similar aspects of the components having a permission guard can be stored in a temporary location in the multi-tenant system. These permission guard components are compiled to respective classes and objects when the evaluation of the permission guard in the metadata evaluates to true.

The application packages, even in a multi-tenant system, can be installed separately for each tenant that elects to utilize the application. These applications are tenant specific. In other implementations, the application and licensing management processes can support multi-tenant packages. A multi-tenant package is installed for multiple tenants, though it may not be enabled for all tenants. In this implementation, the multi-tenant packages are installed as a reference for non-enabled tenants. Thus, these applications are pre-available in the multi-tenant system (or in a sub-system thereof referred to as a pod) and tenants share the same package. When the multi-tenant package is installed only a reference of the package is maintained in a tenant (e.g., in an organization). This alleviates a problem for developers to have to install packages in each tenant (or organization) and upgrades can happen just at the system or pod level and all tenants can be upgraded to the latest version of the reference whenever they prefer to turn it enable the update or the update can be auto enabled. As used herein, and 'application package,' can refer to either an application package that is tenant specific, or can refer to a multi-tenant packages that is not tenant specific.

FIG. 1 is a diagram of one example implementation of an architecture for deployment of application packages. The illustrated implementation includes the multi-tenant platform 101 with support for application and licensing management as described herein. The example implementation also illustrates the infrastructure for deploying applications into the multi-tenant platform 101 as well as manage updates to these application packages taking into consideration licensing rights of tenants.

The components of the development and deployment infrastructure include tooling component 107 that provides a command line interface (CLI) and VSCode support for building, deploying, and debugging application components. An application can be developed as a multi-tenant platform related source code that is stored and accessible via version control software (VCS) or similar storage and/or project control software in communication with a workspace 105 that can host a copy or clone of the project 111 for testing and development. This workspace 105 along with the components hosted by the workspace 105 can be accessed by a developer (e.g., a tenant developer or external developer) via a developer workstation 101.

The developer workstation 101 can execute a local runtime 103. The local runtime 103 is a lightweight emulation of the multi-tenant execution environment that enables testing and creation of applications. The developer can use the local runtime 103 to locally test and debug the components of an application. Triggers for the functions of the application can be simulated using the CLI. 'Scratch' organizations and similar testing context information can be used to locally test integrations and software development kit (SDK) invocations for application component functions at the developer workstation 101 using the local runtime 103.

In addition, the developer can create metadata for the application that defines the components of the application and any permission guards for each component. The permission guards can be logic and code that identify the component within the multi-tenant system, relevant dependencies and criteria and logic for including or enabling the component when the application is installed. The permission guard in the metadata can define the licenses to be held by a tenant to enable, compile, or similarly utilize the associated component. The metadata and permission guards can also define contingencies for application installation where any given permission guard criteria are not met. For example, the meta data for an application can specify that an object utilized in the application requires a specific license of the tenant. If the tenant does not hold that license, then a different substitute object with different capabilities can be substituted for that object.

Once a component or set of components of an application has been completed and tested, a build service can take platform source code 111 in a workspace 105 and perform appropriate build operations for the various platform components to prepare the application and the constituent components for deployment. As used herein, a 'set' refers to any positive whole number of items including one item. The build services 121 outputs a buildpack 123 that includes the application and related metadata amongst other information. A deploy service 231 receives the buildpack and performs deployment operations for the various built platform components including installing metadata 151 into the multi-tenant platform 101 and the application 171 as well according to the details of the metadata 151. The metadata 151 defines the interfaces, calls, triggers, event handling, and similar mechanisms of the application 171 can operate within the multi-tenant platform 101 as well as permission guards related to each of these features. The deployment service 131 deploys and configures exposure and secure connections for the appropriate substrate (e.g., Apex, elastic runtime for polyglot such as Java or Node.js). The metadata 151 can be deployed to a registry or other locale of the multi-tenant platform 101 where it can be checked as updates to the application or tenant licenses are implemented. Core metadata within the metadata 151 is deployed to the appropriate org-based environment of the multi-tenant platform 101, including references to the application 171.

In some implementations, a packaging service 125 takes platform source and application components and packages it for installation and listing on an application exchange 129.

A developer hub 127 enables administration of development configuration such as namespace and developer permissions. The developer hub 127 can provide storage for build packages. An application exchange 129 is a marketplace for developers and tenants to list their multi-tenant platform 101 applications for use by other tenants.

Figure 2:
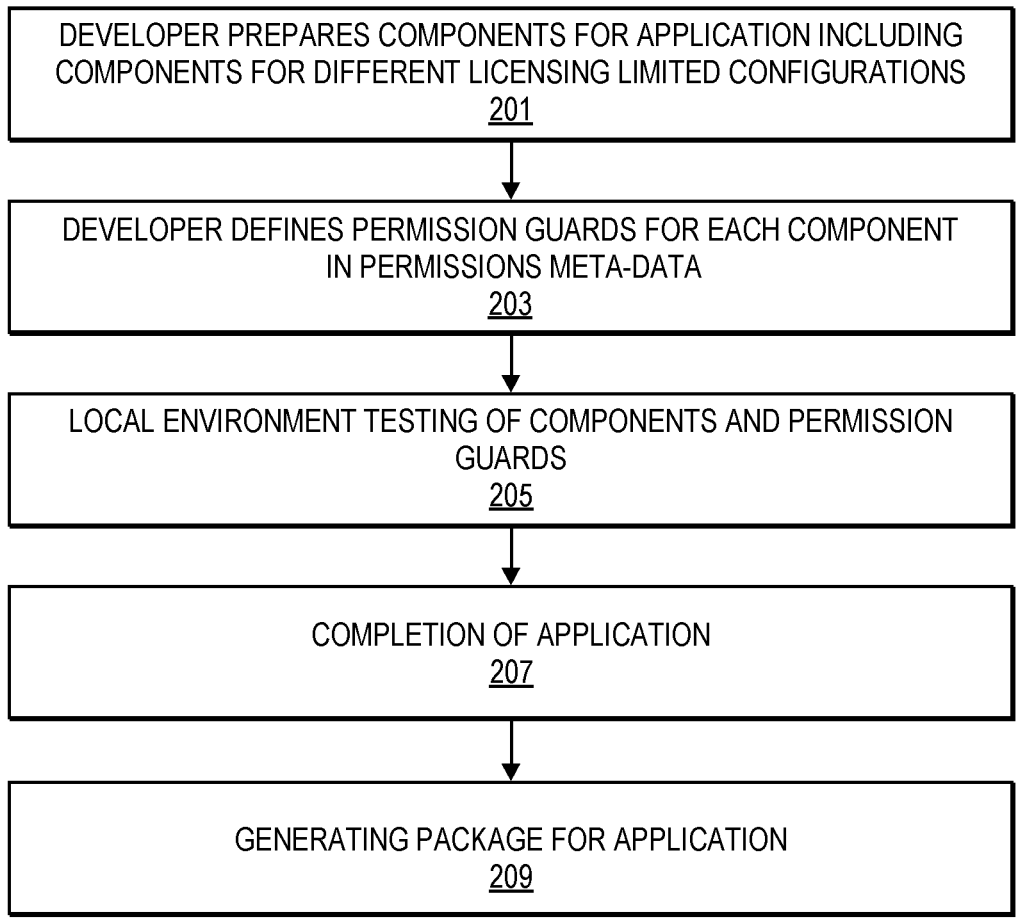
FIG. 2 is a flowchart of a developer process for deploying an application where licensing management is supported in a multi-tenant system according to some example implementations.

FIG. 2 is a flowchart of a developer process for deploying an application where licensing management is supported in a multi-tenant system according to some example implementations. In some implementations, a developer prepares components of an application for distribution into a multi-tenant system (Block 201). Some of the components can have associated licensing requirements that limit their use or availability to tenants that do not have the appropriate licenses. A 'license' as used herein refers to a contractual permission between a licensee and a licensor for the use of a software services or function. Often the licenses are related to services provided by the multi-tenant system provider, where some tenants contract with the multi-tenant service provider for specific services offered via the multi-tenant system. In many cases, the services of the multi-tenant system have inter-dependencies or cross-application support where a tenant has licenses for each of the services. In other cases, the licenses can relate to third party software or services (i.e., software or services offered by an entity other than the application developer or the multi-tenant system provider). The licenses can control the use of any aspect of an application or components of the application including objects, files, data sources, multi-tenant system services, multi-tenant system resources (e.g., computing resources or storage resources), and similar services and functions.

The licensing restrictions can be recorded as permission guards in the metadata (Block 203). This information can be distributed with the application and utilized by the application and licensing management process within the multi-tenant system to enforce the licensing and associated permissions while enabling more dynamic changes to the licensing associated with the application.

After the application components and associated metadata are completed, the application and permission guards associated with the components of the application can be tested locally (Block 205). For example, a local runtime or similar environment can be utilized at a developer workstation or in a workspace area provided by the multi-tenant system. If the local testing is successful, then the application can be finalized (Block 207) and a package can be generated including the components of the application and the metadata (Block 209). The package can include compiled code, object code, source code (e.g., for interpreted languages), and similar software components that can be installed into the multi-tenant system to provide the application and the associated services to at least one tenant of the multi-tenant system. The generation of the application package can initiate the distribution of the application package.

Figure 3:
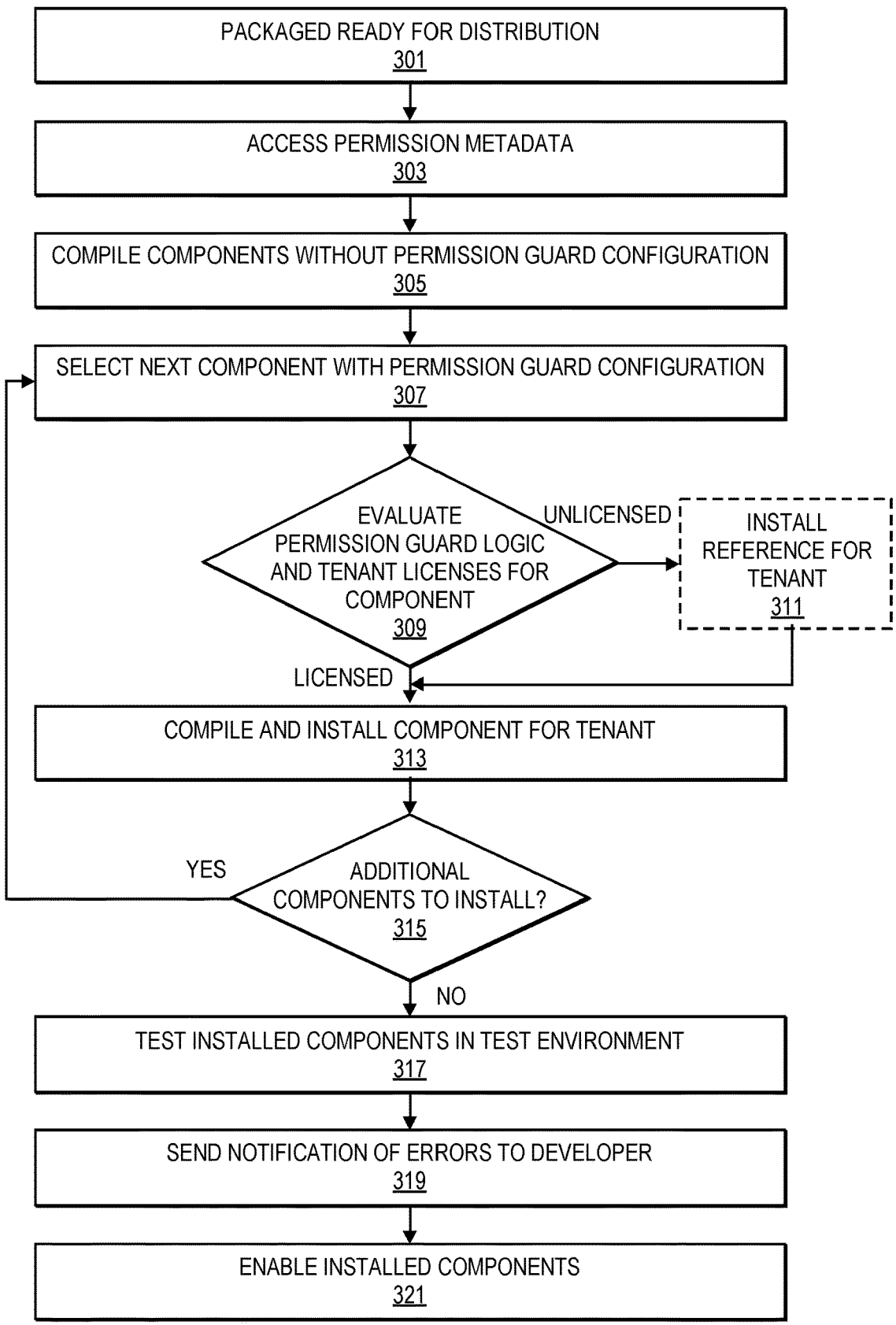
FIG. 3 is a flowchart of a distribution process for deploying an application where licensing management is supported in a multi-tenant system according to some example implementations.

FIG. 3 is a flowchart of a distribution process for deploying an application where licensing management is supported in a multi-tenant system according to some example implementations. The process of distribution can be initiated in response to the application package being readied for distribution (Block 301). The developer can release or forward the application to a package build service to build the application package. The build service can then provide the application package to a deployment service and/or a developer hub. The application package can also be made available in an application exchange. As the application is readied to be installed by the deployment service the metadata from the application package is accessed to determine whether any permission guards are defined (Block 303).

Each component of the application that is not associated with a permission guard can be compiled for installation (Block 305). For each component that is associated with a permission guard, that permission guard is evaluated. The evaluation of the permission guards can be done iteratively (as shown in the illustrated example), in parallel, or in any order. A next component with a permission guard can be selected for evaluation (Block 307). The selected permission guard can then be evaluated by applying the defined logic and looking up status of associated licenses for the associated component and target tenant (Block 309). If the permission guard is evaluated to indicate that the criteria for the component indicates it is not properly licensed or proper permissions criteria are not met, then the component may not be compiled or installed and the next permission guard or component is selected for evaluate where available (Block 315).

If a target tenant is determined to have the proper licenses for the selected component, then the component can be compiled and installed for that tenant (Block 313). The process then checks whether additional components with permission guards are available to be evaluated (Block 315). If additional components with permission guards are available to be evaluated, then the next component or permission guard can be selected (Block 307). Once all of the components with an associated permission guard are evaluated, then the installed components can be tested (Block 317). The test environment can be a protected environment in the multi-tenant system. The test environment can be limited by features, users, resources, or similar aspects to ensure the proper operation of the application without jeopardizing the operation of the multi-tenant platform. If the tests are successful, where no errors are encountered in the application installation and operation, then the process enables the installed components (Block 371). If errors occurred during the testing, then notifications of the errors can be sent to the developer, multi-tenant system administrators, the tenant and/or other relevant entities (Block 319). Where the errors do not break the basic operation of the application then the application and installed components are enabled for the target tenant (Block 321).

In cases where the application packages are multi-tenant application packages, where any tenant in a multi-tenant system or pod is found not to have the necessary licenses or permissions for a component or application, then the application or components are installed but only as a reference for the unlicensed tenants (Block 311). The application or components being installed as a 'reference' indicates that the application and/or components are installed in an executable form, but the functionality is not enabled for the unlicensed tenant. However, where the tenant subsequently obtains the associated licenses, these functions can be enabled without requiring a reinstallation of the application or components.

Figure 4:
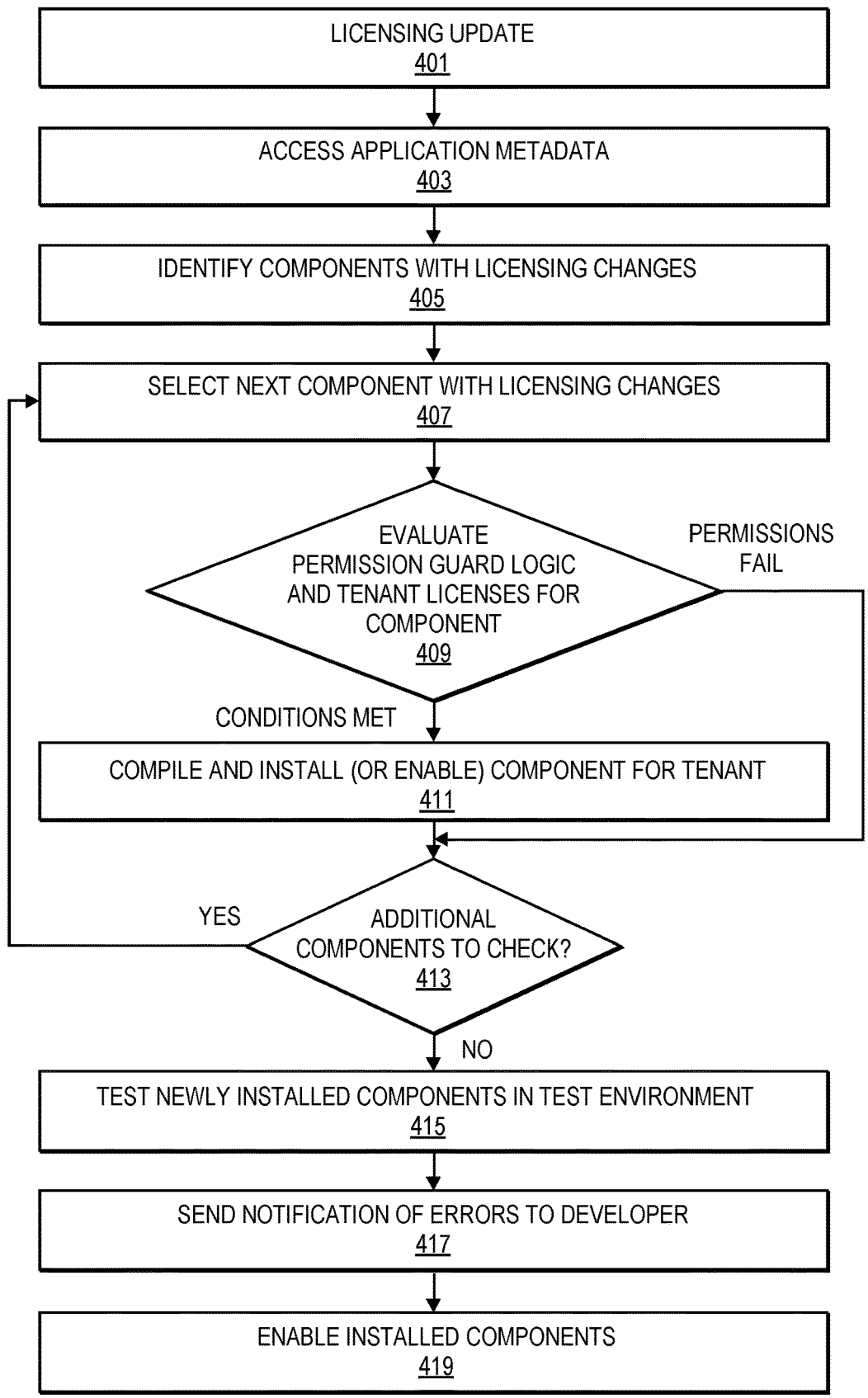
FIG. 4 is a flowchart of a licensing update process for managing an application where licensing management is supported in a multi-tenant system according to some example implementations.

FIG. 4 is a flowchart of a licensing update process for managing an application where licensing management is supported in a multi-tenant system according to some example implementations. An application and licensing manager or similar software within the multi-tenant system can manage the enablement of components in the system as the licensing agreements of tenants change. The process can be triggered by any change to the licensing or similar permissions information in the multi-tenant system. The licensing information can be stored or tracked in any data format, database, or other storage system in communication with multi-tenant system or accessible to the application and licensing manager. The application and licensing manager can monitor the licensing information for changes or can be notified of changes to application metadata related to permission guards for components of an application (Block 401).

The application and licensing manager can then access the metadata of the application (Block 403). The metadata can be searched to identify components with associated licensing changes (i.e., changes to the permission guards) (Block 405). These changes can be iteratively evaluated, can be evaluated as a batch, in parallel or any combination thereof. An example of an iterative process is provided by way of example and not limitation. The next component with a licensing change can be selected (Block 407). The permission guard logic and tenant licenses for the selected component can be evaluated to determine whether a target tenant has met conditions for the permission guard for that component (Block 409). If the conditions for the permission guard are met, then the component can be compiled and installed for the tenant (Block 411). Where multi-tenant application packages are utilized, the component can be enabled without the need for installation. If the conditions for the permission guard are not met, then no compilation, install, or enablement may be effected.

The process continues where there are additional components with licensing changes that have been identified (Block 413) by selecting a next component (Block 407). When all of the components with licensing changes have been evaluated, then a test of the newly installed components can be performed in a test environment (Block 415). The test environment can occur on the multi-tenant system in a cloned copy of the tenant space or similar protected environment. Notifications of any errors in the operation, compilation, or installation of the application can be sent to the application developers, multi-tenant system administrators, tenant, or other relevant entities (Block 417). If the errors do not significantly impact the operation of the application, tenant, and/or multi-tenant system then the application and components can be enabled (Block 419). In other cases, the enablement and installation can be rolled back or stalled until corrected.

FIG. 5 is a diagram of an example of metadata for licensing and application management in a multi-tenant system according to some example implementations. In the example of metadata a single permission guard is shown defined within a metadata for an application. In this example, the permission guard identifies at least one name, type, and index for the permissions that apply to the component. A set of 'conditions' can be defined that must be met for the evaluation of the permission guard to enable the associated component. Similarly, the components can be identified by any name or references. In some implementations, permission guards can be grouped by tenant, application, component, or similar organization.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface (s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 6A:
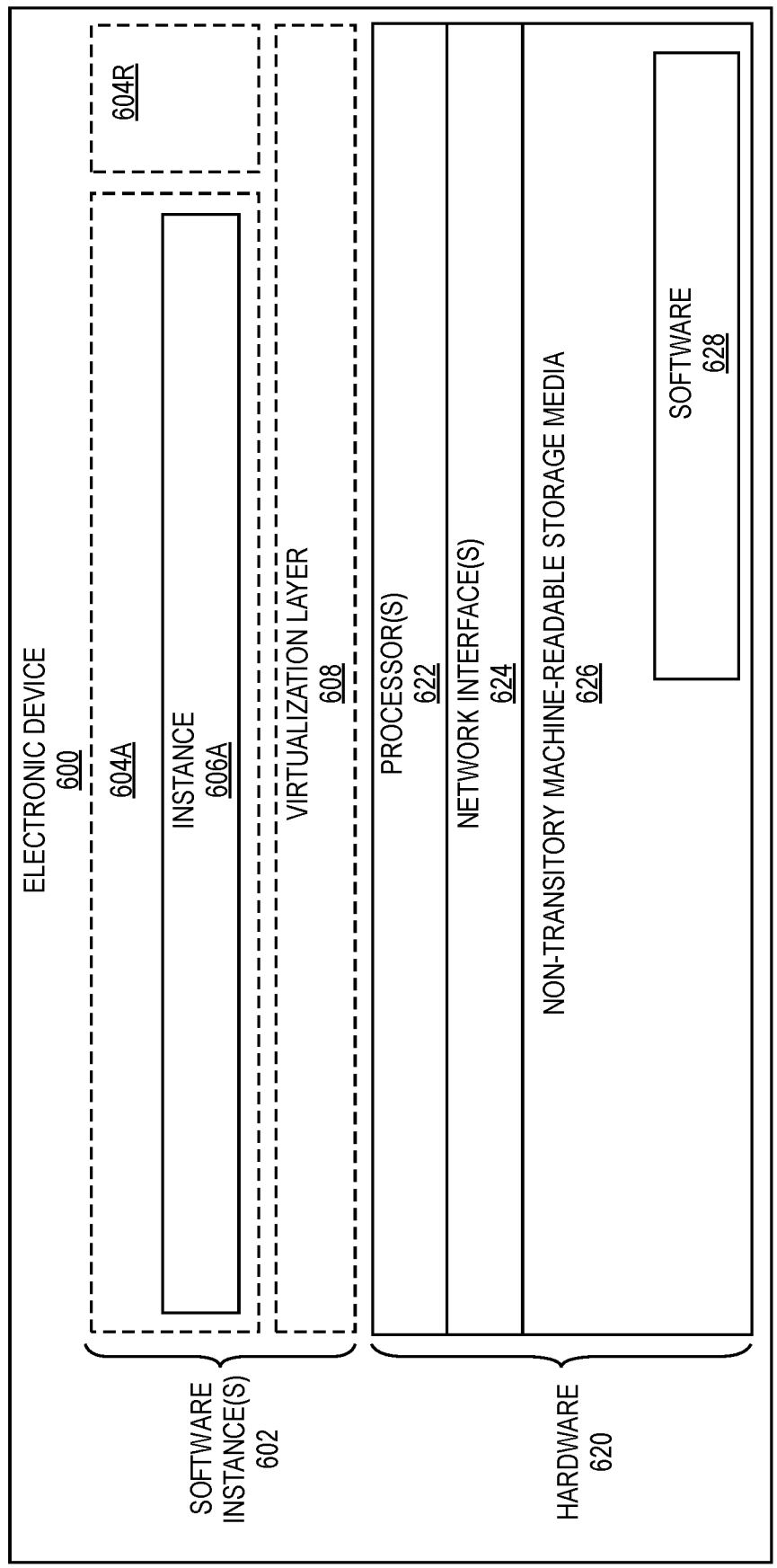
FIG. 6A is a block diagram illustrating an electronic device according to some example implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and non-transitory machine-readable storage media 626 having stored therein software 628 (which includes instructions executable by the set of one or more processor(s) 622). Each of the previously described application and licensing management functions may be implemented in one or more electronic devices 600. In one implementation: 1) each of the end user clients is implemented in a separate one of the electronic devices 600 (e.g., in user electronic devices operated by users where the software 628 represents the software to implement end user clients to interface with the application and licensing management functions (e.g., a web browser, a native client, a portal, a command-line interface, and/or an application program interface (API) based upon protocols such as Simple Object Access Protocol (SOAP), Representational State Transfer (REST), etc.)); 2) the Application and licensing management functions is implemented in a separate set of one or more of the electronic devices 600 (e.g., a set of one or more server electronic devices where the software 628 represents the software to implement the application and licensing management functions); and 3) in operation, the electronic devices implementing the end user clients and the Application and licensing management functions would be communicatively coupled (e.g., by a network) and would establish between them (or through one or more other layers) connections for submitting changes to the application and licensing management functions. Other configurations of electronic devices may be used in other implementations (e.g., an implementation in which the application and licensing management functions are implemented on a single electronic device 600).

In electronic devices that use compute virtualization, the set of one or more processor(s) 622 typically execute software to instantiate a virtualization layer 608 and software container(s) 604A-R (e.g., with operating system-level virtualization, the virtualization layer 608 represents the kernel of an operating system (or a shim executing on a base operating system) that allows for the creation of multiple software containers 604A-R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 628 (illustrated as instance 606A) is executed within the software container 604A on the virtualization layer 608. In electronic devices where compute virtualization is not used, the instance 606A on top of a host operating system is executed on the "bare metal" electronic device 600. The instantiation of the instance 606A, as well as the virtualization layer 608 and software containers 604A-R if implemented, are collectively referred to as software instance(s) 602.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 6B:
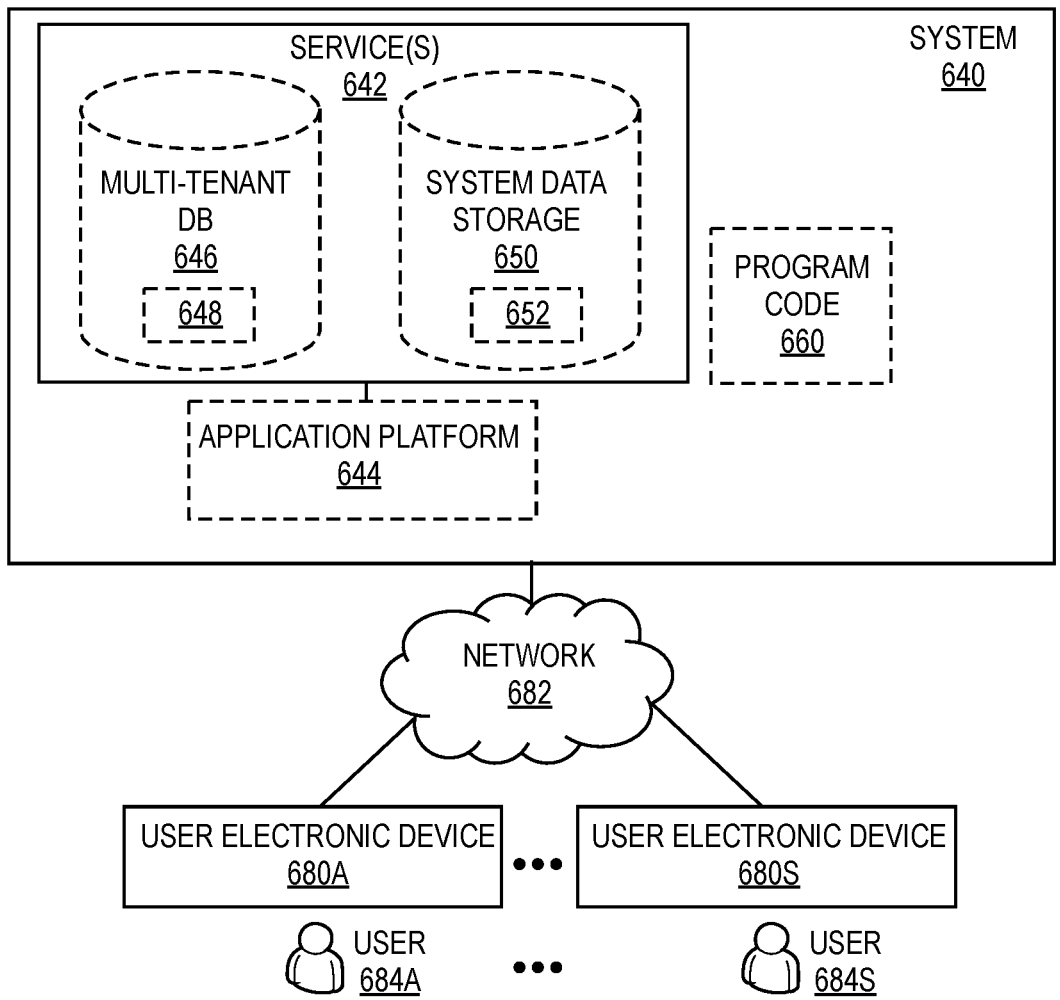
FIG. 6B is a block diagram of an environment where an application and licensing manager may be deployed, according to some implementations.

FIG. 6B is a block diagram of a deployment environment according to some example implementations. A system 640 includes hardware (a set of one or more electronic devices) and software to provide service(s) 642, including the Application and licensing management functions. The system 640 is coupled to user electronic devices 680A-S over a network 682. The service(s) 642 may be on-demand services that are made available to one or more of the users 684A-S working for one or more other organizations (sometimes referred to as outside users) so that those organizations do not need to necessarily be concerned with building and/or maintaining a system, but instead makes use of the service(s) 642 when needed (e.g., on the demand of the users 684A-S). The service(s) 642 may communication with each other and/or with one or more of the user electronic devices 680A-S via one or more Application Programming Interface(s) (APIs) (e.g., a Representational State Transfer (REST) API). The user electronic devices 680A-S are operated by users 684A-S.

In one implementation, the system 640 is a multi-tenant cloud computing architecture supporting multiple services, such as application and licensing management functions, customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 640 may include an application platform 644 that enables PAAS for creating, managing, and executing one or more applications developed by the provider of the application platform 644, users accessing the system 640 via one or more of user electronic devices 680A-S, or third-party application developers accessing the system 640 via one or more of user electronic devices 680A-S.

In some implementations, one or more of the service(s) 642 may utilize one or more multi-tenant databases 646 for tenant data 648, as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user electronic device 680A-S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the one or more multi-tenant database 646 and/or system data storage 650.

In some implementations, the service(s) 642 are implemented using virtual applications dynamically created at run time responsive to queries from the user electronic devices 680A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications, including the Application and licensing management functions, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 640 and the user electronic devices 680A-S.

Each user electronic device 680A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 640. For example, the user interface device can be used to access data and applications hosted by system 640, and to perform searches on stored data, and otherwise allow a user 684 to interact with various GUI pages that may be presented to a user 684. User electronic devices 680A-S might communicate with system 640 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 680A-S might include an HTTP client, commonly referred to as a "browser," for sending and receiving HTTP messages to and from server(s) of system 640, thus allowing users 684 of the user electronic device 680A-S to access, process and view information, pages and applications available to it from system 640 over network 682.

Conclusion

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method to manage application package installation in a multi-tenant system, the method comprising:
   accessing metadata of an application package for distribution in the multi-tenant system, wherein the metadata identifies one or more components of the application package that are associated with a respective permission guard, each respective permission guard containing logic for evaluating whether or not a tenant is licensed to utilize the associated component; and
   in response to identifying a component associated with a permission guard:
      determining, based on the logic in the associated permission guard, whether or not a target tenant in the multi-tenant system meets criteria for utilizing the component, and
      compiling and installing either a usable version of the component or a non-functional version of the component depending on the determination.

2. The method of claim 1, further comprising:
   identifying components of the application package without permission guards; and
   installing and compiling the components without permission guards.

3. The method of claim 1, further comprising:
   installing the usable version in accordance with a determination that the target tenant meets the criteria, and installing the non-functional version in accordance with a determination that the target tenant does not meet the criteria.

4. The method of claim 1, further comprising:
   testing the component in a test environment before enabling for the target tenant; and
   sending notification of errors found during testing to a developer of the component.

5. The method of claim 1, further comprising:
   identifying a change to a licensing status of the component for the target tenant;
   redetermining whether the target tenant meets the criteria based on an identified change; and
   installing or enabling the usable version of the component based on the redetermination.

6. The method of claim 1, wherein installing the usable version of the component includes installing the component for a pod of a multi-tenant system and enabling the component for all licensed tenants of the pod.

7. A non-transitory machine-readable storage medium that provides instructions to manage application package installation in a multi-tenant system that, if executed by a processor, will cause said processor to perform operations comprising:
   accessing metadata of an application package for distribution in the multi-tenant system, wherein the metadata identifies one or more components of the application package that are associated with a respective permission guard, each respective permission guard containing logic for evaluating whether or not a tenant is licensed to utilize the associated component; and
   in response to identifying a component associated with a permission guard:
      determining, based on the logic in the associated permission guard, whether or not a target tenant in the multi-tenant system meets criteria for utilizing the component, and
      compiling and installing either a usable version of the component or a non-functional version of the component in response to the permission guard logic indicating the tenant of the multi-tenant system has met conditions to utilize the component depending on the determination.

8. The non-transitory machine-readable storage medium of claim 7, wherein the operations further comprise:
   identifying components of the application package without permission guards; and
   installing and compiling the components without permission guards.

9. The non-transitory machine-readable storage medium of claim 7, wherein the operations further comprise:
   installing the usable version in accordance with a determination that the target tenant meets the criteria, and installing the non-functional version in accordance with a determination that the target tenant does not meet the criteria.

10. The non-transitory machine-readable storage medium of claim 7, wherein the operations further comprise:
    testing the component in a test environment before enabling for the target tenant; and
    sending notification of errors found during testing to a developer of the component.

11. The non-transitory machine-readable storage medium of claim 7, wherein the operations further comprise:
    identifying a change to a licensing status of the component for the target tenant;

redetermining whether the target tenant meets the criteria based on an identified change; and installing or enabling the usable version of the component based on the redetermination.

12. The non-transitory machine-readable storage medium of claim 7, wherein installing the usable version of the component includes installing the component for a pod of a multi-tenant system and enabling the component for all licensed tenants of the pod.

13. A computing device comprising:
a non-transitory machine-readable storage medium having stored therein an application and licensing manager configurable to manage application package installation in a multi-tenant system; and
a processor coupled to the non-transitory machine-readable storage medium, the processor to execute the application and licensing manager, the application and licensing manager configurable to perform operations of:
  accessing metadata of an application package for distribution in the multi-tenant system, wherein the metadata identifies one or more components of the application package that are associated with a respective permission guard, each respective permission guard containing logic for evaluating whether or not a tenant is licensed to utilize the associated component, and
  in response to identifying a component associated with a permission guard:
    determining, based on the logic in the associated permission guard, whether or not a target tenant in the multi-tenant system meets criteria for utilizing the component, and
    compiling and installing either a usable version of the component or a non-functional version of the component in response to the permission guard logic indicating the tenant of the multi-tenant system has met conditions to utilize the component depending on the determination.

14. The computing device of claim 13, wherein the operations include identifying components of the application package without permission guards, and installing and compiling the components without permission guards.

15. The computing device of claim 13, wherein the operations include installing the usable version in accordance with a determination that the target tenant meets the criteria, and installing the non-functional version in accordance with a determination that the target tenant does not meet the criteria.

16. The computing device of claim 13, wherein the operations include testing the component in a test environment before enabling for the target tenant, and sending notification of errors found during testing to a developer of the component.

17. The computing device of claim 13, wherein the operations include identifying a change to a licensing status of the component for the target tenant, redetermining whether the target tenant meets the criteria based on an identified change, and installing or enabling the usable version of the component based on the redetermination.

18. The computing device of claim 13, wherein installing the usable version of the component includes installing the usable version of the component for a pod of a multi-tenant system and enabling the component for all licensed tenants of the pod.

* * * * *